United States Patent
Koo et al.

(10) Patent No.: US 7,479,300 B2
(45) Date of Patent: Jan. 20, 2009

(54) COMPOSITE POLYAMIDE REVERSE OSMOSIS MEMBRANE AND METHOD OF PRODUCING THE SAME

(75) Inventors: Ja-Young Koo, Billerica, MA (US); Sung Pyo Hong, Kyungbuk (KR); Jong Hwa Lee, Seoul (KR); Jun Suk Kim, Seoul (KR)

(73) Assignee: Woongjin Chemical Co., Ltd., Gyeongsangbuk-Do (KR)

( * ) Notice: Subject to any disclaimer, the term of this patent is extended or adjusted under 35 U.S.C. 154(b) by 467 days.

(21) Appl. No.: 11/094,562

(22) Filed: Mar. 30, 2005

(65) Prior Publication Data

US 2006/0219628 A1 Oct. 5, 2006

(51) Int. Cl.
*B01D 5/00* (2006.01)
*B29C 65/00* (2006.01)
*B29C 67/20* (2006.01)

(52) U.S. Cl. .................. 427/244; 427/245; 264/41; 264/49

(58) Field of Classification Search .......... 210/490, 210/500.27, 500.38, 652; 427/244, 245; 264/41, 49; 428/319.3
See application file for complete search history.

(56) References Cited

U.S. PATENT DOCUMENTS

| 4,277,344 | A | | 7/1981 | Cadotte | |
| 4,872,984 | A | | 10/1989 | Tomaschke | |
| 4,983,291 | A | | 1/1991 | Chau et al. | |
| 5,733,602 | A | | 3/1998 | Hirose et al. | |
| 6,015,495 | A | | 1/2000 | Koo et al. | |
| 6,024,873 | A | * | 2/2000 | Hirose et al. | ........... 210/500.38 |
| 6,171,497 | B1 | * | 1/2001 | Hirose et al. | ........... 210/500.38 |
| 6,245,234 | B1 | * | 6/2001 | Koo et al. | ............. 210/500.38 |
| 6,723,422 | B1 | * | 4/2004 | Hirose et al. | ............. 428/319.3 |
| 7,138,058 | B2 | * | 11/2006 | Kurth et al. | ............. 210/500.38 |
| 7,247,370 | B2 | * | 7/2007 | Childs et al. | ............. 428/310.5 |

* cited by examiner

*Primary Examiner*—Ana M Fortuna
(74) *Attorney, Agent, or Firm*—Kriegsman & Kriegsman

(57) ABSTRACT

A composite polyamide reverse osmosis membrane and method of producing same. In a preferred embodiment, the membrane is made by coating a porous polysulfone support with an aqueous solution containing 2 wt % m-phenylenediamine (MPD), and 0.1 wt % di(ethylene glycol) hexyl methyl ether. Next, the excess solution is removed, and the coated support is dipped in 0.1 wt % organic solvent solution of trimesoyl chloride (TMC) in a mixture of alkanes having from 8 to 12 carbon atoms. After draining the TMC solution off, the resulting composite membrane is air dried and then rinsed in a basic aqueous solution. The resultant membrane exhibits a flux of 21.3 gfd and a salt rejection of 98.9% when used at 225 psi for an aqueous solution containing 2000 ppm of NaCl.

6 Claims, No Drawings

COMPOSITE POLYAMIDE REVERSE OSMOSIS MEMBRANE AND METHOD OF PRODUCING THE SAME

BACKGROUND OF THE INVENTION

The present invention relates generally to reverse osmosis membranes and more particularly to a novel composite polyamide reverse osmosis membrane and to a method of producing the same.

It is known that dissolved substances can be separated from their solvents by the use of various types of selective membranes, examples of such membranes including microfiltration membranes, ultrafiltration membranes and reverse osmosis membranes. One use to which reverse osmosis membranes have previously been put is in the desalination of brackish water or seawater to provide large volumes of relatively non-salty water suitable for industrial, agricultural or home use. What is involved in the desalination of brackish water or seawater using reverse osmosis membranes is literally a filtering out of salts and other dissolved ions or molecules from the salty water by forcing the salty water through a reverse osmosis membrane whereby purified water passes through the membrane while salts and other dissolved ions and molecules do not pass through the membrane. Osmotic pressure works against the reverse osmosis process, and the more concentrated the feed water, the greater the osmotic pressure which must be overcome.

A reverse osmosis membrane, in order to be commercially useful in desalinating brackish water or seawater on a large scale, must possess certain properties. One such property is that the membrane have a high salt rejection coefficient. In fact, for the desalinated water to be suitable for many commercial applications, the reverse osmosis membrane should have a salt rejection capability of at least about 97% and more preferably has a salt rejection capability of at least about 98.5%. Another important property of a reverse osmosis membrane is that the membrane possess a high flux characteristic, i.e., the ability to pass a relatively large amount of water through the membrane at relatively low pressures. Typically, the flux for the membrane should be greater than 10 gallons/ft$^2$-day (gfd) at a pressure of 800 psi for seawater and should be greater than 15 gfd at a pressure of 220 psi for brackish water. For certain applications, a lower flux than would otherwise be desirable may be acceptable in exchange for a higher rejection capability and vice versa.

One common type of reverse osmosis membrane is a composite membrane comprising a porous support and a thin polyamide film formed on the porous support. Typically, the polyamide film is formed by an interfacial polymerization of a polyfunctional amine and a polyfunctional acyl halide.

An example of the aforementioned composite reverse osmosis membrane is disclosed in U.S. Pat. No. 4,277,344, inventor Cadotte, which issued Jul. 7, 1981, and which is incorporated herein by reference. The aforementioned patent describes an aromatic polyamide film which is the interfacial reaction product of an aromatic polyfunctional amine having at least two primary amines substituents with an aromatic acyl halide having at least three acyl halide substituents. In the preferred embodiment, a porous polysulfone support is coated with m-phenylenediamine in water. After removal of excess m-phenylenediamine solution from the coated support, the coated support is covered with a solution of trimesoyl chloride dissolved in "FREON" TF solvent (trichlorotrifluoroethane). The contact time for the interfacial reaction is 10 seconds, and the reaction is substantially complete in 1 second. The resulting polysulfone/polyamide composite is then air-dried.

Although the Cadotte membrane described above exhibits good flux and good salt rejection, various approaches have been taken to further improve the flux and salt rejection of composite polyamide reverse osmosis membranes. In addition, other approaches have been taken to improve the resistance of said membranes to chemical degradation and the like. Many of these approaches have involved the use of various types of additives to the solutions used in the interfacial polycondensation reaction.

For example, in U.S. Pat. No. 4,872,984, inventor Tomaschke, which issued Oct. 10, 1989, and which is incorporated herein by reference, there is disclosed an aromatic polyamide membrane formed by (a) coating a microporous support with an aqueous solution comprising (i) an essentially monomeric, aromatic, polyfunctional amine reactant having at least two amine functional groups and (ii) an amine salt to form a liquid layer on the microporous support, (b) contacting the liquid layer with an organic solvent solution of an essentially monomeric, aromatic, amine-reactive reactant comprising a polyfunctional acyl halide or mixture thereof, wherein the amine-reactive reactant has, on the average, at least about 2.2 acyl halide groups per reactant molecule, and (c) drying the product of step (b) so as to form a water permeable membrane.

In U.S. Pat. No. 4,983,291, inventors Chau et al., which issued Jan. 8, 1991, and which is incorporated herein by reference, there is disclosed a membrane which comprises a polymerized reaction product within and/or on a porous support backing material. According to the Chau et al. patent, said membrane may be prepared by contacting a porous support with an aqueous solution of a polyfunctional amine which may, if so desired, contain a polar aprotic solvent not reactive with the amines, a polyhydric compound and an acid acceptor. The surface of the coated support is freed of excess solution and thereafter contacted with an organic solution of a polyacyl halide for a period of time sufficient to form a polymerized reaction product within and/or on the support material. The resulting composite is then treated with a hydroxypolycarboxylic acid, polyaminoalkylene polycarboxylic acid, sulfonic acid, amine salts of acids, amino acid, amino acid salt, polymeric acid and inorganic acid, before drying of the membrane.

In U.S. Pat. No. 5,733,602, inventors Hirose et al., which issued Mar. 31, 1998, and which is incorporated herein by reference, there is disclosed a method for producing a composite reverse osmosis membrane comprising the steps of coating a porous support with a solution (A) containing a compound having at least two reactive amino groups per molecule and bringing a solution (B) containing a polyfunctional acid halide into contact with the solution (A) to induce crosslinking to form a crosslinked polyamide skin layer, in which the crosslinking is carried out in the presence of a substance (S) having a solubility parameter of 8 to 14 (cal/cm$^3$)$^{1/2}$. In a preferred embodiment of the above method, substance (S) is at least one member selected from the group consisting of alcohols and ethers. In another preferred embodiment of the above method, substance (S) is present in at least one of solution (A) and solution (B).

In U.S. Pat. No. 6,015,495, inventors Koo et al., which issued Jan. 18, 2000, and which is incorporated herein by reference, there is disclosed a composite polyamide reverse osmosis membrane and method of producing the same. According to one embodiment, the membrane comprises a porous support and a polyamide membrane on the porous support, the polyamide membrane comprising a reaction product of (i) an aqueous solution comprising a polyfunctional amine and a mixed solvent, said mixed solvent comprising water and a polar compound, said polar compound being selected from the group consisting of di(propylene glycol) monoalkyl ethers, alkyl-substituted 1,3-propanediols, 1,2-alkanediols, di(ethylene glycol) hexyl ether, di(ethylene glycol) t-butyl methyl ether, tri(ethylene glycol) dimethyl ether, and 1,x-cylcohexanedimethanol wherein x is an integer from 2 to 4; and (ii) an organic solvent solution comprising an amine-reactive reactant selected from the group consisting of a polyfunctional acyl halide, a polyfunctional sulfonyl halide and a polyfunctional isocyanate.

SUMMARY OF THE INVENTION

It is an object of the present invention to provide a novel polyamide membrane.

It is another object of the present invention to provide a novel composite polyamide reverse osmosis membrane.

It is still another object of the present invention to provide a novel method of producing a composite polyamide reverse osmosis membrane.

Therefore, according to one aspect of the present invention, there is provided a polyamide membrane, said polyamide membrane comprising a reaction product of (i) an aqueous solution comprising a polyfunctional amine; and (ii) an organic solvent solution comprising an amine-reactive reactant selected from the group consisting of a polyfunctional acyl halide, a polyfunctional sulfonyl halide and a polyfunctional isocyanate; (iii) wherein at least one of said aqueous solution and said organic solvent solution further comprises at least one polar compound selected from the group consisting of di(ethylene glycol) decyl methyl ether; di(ethylene glycol) octyl methyl ether; di(ethylene glycol) benzyl methyl ether; di(ethylene glycol) heptyl methyl ether; di(ethylene glycol) hexyl methyl ether; di(ethylene glycol) pentyl methyl ether; di(ethylene glycol) butyl methyl ether; di(ethylene glycol) propyl methyl ether; tri(ethylene glycol) decyl methyl ether; tri(ethylene glycol) octyl methyl ether; tri(ethylene glycol) benzyl methyl ether; tri(ethylene glycol) heptyl methyl ether; tri(ethylene glycol) hexyl methyl ether; tri(ethylene glycol) pentyl methyl ether; tri(ethylene glycol) butyl methyl ether; tri(ethylene glycol) propyl methyl ether; tetra(ethylene glycol) decyl methyl ether; tetra(ethylene glycol) octyl methyl ether; tetra(ethylene glycol) benzyl methyl ether; tetra(ethylene glycol) heptyl methyl ether; tetra(ethylene glycol) hexyl methyl ether; tetra(ethylene glycol) pentyl methyl ether; tetra(ethylene glycol) butyl methyl ether; tetra(ethylene glycol) propyl methyl ether; tetra(ethylene glycol) dimethyl ether; poly(ethylene glycol) dimethyl ether; di(ethylene glycol) divinyl ether; tri(ethylene glycol) divinyl ether; tetra(ethylene glycol) divinyl ether; and poly(ethylene glycol) divinyl ether.

Where the aforementioned at least one polar compound is added to the aqueous solution so as to form a mixed solvent in said solution, said at least one polar compound preferably constitutes no more than about 5%, by weight, more preferably no more than about 3%, by weight, of said mixed solvent. Where the aforementioned at least one polar compound is added to the organic solvent solution so as to form a mixed solvent in said solution, said at least one polar compound preferably constitutes no more than about 5%, by weight, more preferably no more than about 3%, by weight, of said mixed solvent.

The present inventors have discovered that a composite reverse osmosis membrane comprising a porous support and the above-described polyamide membrane mounted on said porous support exhibits unexpectedly good salt rejection and flux characteristics.

The present invention is also directed to a composite polyamide reverse osmosis membrane that includes a porous support and the above-described polyamide membrane.

The present invention is further directed to a method of producing a composite polyamide reverse osmosis membrane of the type described above.

Additional objects, features, aspects and advantages of the present invention will be set forth, in part, in the description which follows and, in part, will be obvious from the description or may be learned by practice of the invention. Certain embodiments of the invention will be described hereafter in sufficient detail to enable those skilled in the art to practice the invention, and it is to be understood that other embodiments may be utilized and that structural or other changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

According to one aspect, the present invention is directed to a composite polyamide reverse osmosis membrane, said composite polyamide reverse osmosis membrane comprising (a) a porous support; and (b) a polyamide layer on said porous support, said polyamide layer comprising a reaction product of (i) an aqueous solution comprising a polyfunctional amine; and (ii) an organic solvent solution comprising an amine-reactive reactant selected from the group consisting of a polyfunctional acyl halide, a polyfunctional sulfonyl halide and a polyfunctional isocyanate; (iii) wherein at least one of said aqueous solution and said organic solvent solution further comprises at least one polar compound of the type described below.

The porous support of the present invention is typically a microporous support. The particular microporous support employed in the present invention is not critical thereto but is generally a polymeric material containing pore sizes which are of sufficient size to permit the passage of permeate therethrough but not large enough so as to interfere with the bridging over of the ultrathin membrane formed thereon. The pore size of the support will generally range from 1 to 300 nanometers inasmuch as pores which are larger in diameter than 300 nanometers will permit the ultrathin film to sag into the pores, thus disrupting the flat sheet configuration desired. Examples of microporous supports useful in the present invention include those made of a polysulfone, a polyether sulfone, a polyimide, a polyamide, polypropylene and various halogenated polymers, such as polyvinylidene fluoride. Additional microporous support materials may be found in the patents incorporated herein by reference.

The thickness of the microporous support is not critical to the present invention. Generally, the thickness of the microporous support is about 25 to 125 μm, preferably about 40 to 75 μm.

The polyfunctional amine reactant employed in the present invention is preferably an essentially monomeric amine having at least two amine functional groups, more preferably 2 to 3 amine functional groups. The amine functional group is typically a primary or secondary amine functional group, preferably a primary amine functional group. The particular polyfunctional amine employed in the present invention is not critical thereto and may be a single polyfunctional amine or a combination thereof. Examples of suitable polyfunctional amines include aromatic primary diamines, such as meta-phenylenediamine and para-phenylenediamine and substituted derivatives thereof, wherein the substituent includes, e.g., an alkyl group, such as a methyl group or an ethyl group, an alkoxy group, such as a methoxy group or an ethoxy group, a hydroxy alkyl group, a hydroxy group or a halogen atom. Additional examples of suitable polyfunctional amines include alkanediamines, such as 1,3-propanediamine and its homologs with or without N-alkyl or aryl substituents, cycloaliphatic primary diamines, such as cyclohexane diamine, cycloaliphatic secondary diamines, such as piperizine and its alkyl derivatives, aromatic secondary amines, such as N,N'-dimethyl-1,3-phenylenediamine, N,N'-diphenylethylene diamine, benzidine, xylylene diamine and derivatives thereof. Other suitable polyfunctional amines may be found in the patents incorporated herein by reference. The preferred polyfunctional amines of the present invention are aromatic primary diamines, more preferably m-phenylenediamine.

The polyfunctional amine is present in the aqueous solution in an amount ranging from about 0.1 to 20%, preferably 0.5 to 8%, by weight, of the aqueous solution. The pH of said aqueous solution is in the range of from about 7 to 13. The pH can be adjusted by the presence of a basic acid acceptor in the solution in an amount ranging from about 0.001 to 5%, by weight. Examples of the aforementioned acid acceptors include hydroxides, carboxylates, carbonates, borates, phosphates of alkali metals, and trialkylamines.

The amine-reactive reactant employed in the present invention is one or more compounds selected from the group consisting of a polyfunctional acyl halide, a polyfunctional sulfonyl halide and a polyfunctional isocyanate. Preferably, the amine-reactive reactant is an essentially monomeric, aromatic, polyfunctional acyl halide, examples of which include di- or tricarboxylic acid halides, such as trimesoyl chloride (TMC), isophthaloyl chloride (IPC), terephthaloyl chloride (TPC) and mixtures thereof. Examples of other amine-reactive reactants are disclosed in the patents incorporated herein by reference.

The organic solvent solution which is utilized as the carrier for the amine-reactive reactant comprises any organic liquid immiscible with water, the amine-reactive reactant being present in the organic liquid in an amount in the range of from about 0.005 to 5%, preferably 0.01 to 0.5%, by weight, of the solution. Examples of the aforementioned organic liquid include hexane, cyclohexane, heptane, alkanes having from 8 to 12 carbon atoms, and halogenated hydrocarbons, such as the FREON series. Other examples of the above-described organic liquid may be found in the patents incorporated herein by reference. Preferred organic solvents are alkanes having from 8 to 12 carbon atoms and mixtures thereof. ISOPAR® solvent (Exxon Corp.) is such a mixture of alkanes having from 8 to 12 carbon atoms.

The polar compounds of the present invention may be categorized into three classes of polar compounds. The first such class of polar compounds are asymmetrically-substituted dialkyl di(ethylene glycol), tri(ethylene glycol), tetra(ethylene glycol) and poly(ethylene glycol) ethers selected from the group consisting of di(ethylene glycol) decyl methyl ether; di(ethylene glycol) octyl methyl ether; di(ethylene glycol) benzyl methyl ether; di(ethylene glycol) heptyl methyl ether; di(ethylene glycol) hexyl methyl ether; di(ethylene glycol) pentyl methyl ether; di(ethylene glycol) butyl methyl ether; di(ethylene glycol) propyl methyl ether; tri(ethylene glycol) decyl methyl ether; tri(ethylene glycol) octyl methyl ether; tri(ethylene glycol) benzyl methyl ether; tri(ethylene glycol) heptyl methyl ether; tri(ethylene glycol) hexyl methyl ether; tri(ethylene glycol) pentyl methyl ether; tri(ethylene glycol) butyl methyl ether; tri(ethylene glycol) propyl methyl ether; tetra(ethylene glycol) decyl methyl ether; tetra(ethylene glycol) octyl methyl ether; tetra(ethylene glycol) benzyl methyl ether; tetra(ethylene glycol) heptyl methyl ether; tetra(ethylene glycol) hexyl methyl ether; tetra(ethylene glycol) pentyl methyl ether; tetra(ethylene glycol) butyl methyl ether; and tetra(ethylene glycol) propyl methyl ether.

The second such class of polar compounds consists of tetra(ethylene glycol) dimethyl ether and poly(ethylene glycol) dimethyl ether.

The third such class of polar compounds consists of di(ethylene glycol) divinyl ether; tri(ethylene glycol) divinyl ether; tetra(ethylene glycol) divinyl ether; and poly(ethylene glycol) divinyl ether.

Two or more of the above compounds, either from the same class of compounds or from different classes of compounds, may be combined.

For purposes of the present specification and claims, the alkyl groups of the above-described first class of polar compounds are "normal or n-alkyl groups" unless otherwise noted. In addition, for purposes of the present specification and claims, the term "poly(ethylene glycol)" is defined to mean (ethylene glycol) homologues greater than tetra(ethylene glycol), such as penta(ethylene glycol), hexa(ethylene glycol), hepta(ethylene glycol), etc., or a mixture thereof.

Several of the subject polar compounds, such as di(ethylene glycol) divinyl ether, tri(ethylene glycol) divinyl ether, tetra(ethylene glycol) dimethyl ether, poly(ethylene glycol) dimethyl ether and poly(ethylene glycol) divinyl ether, are commercially available (e.g., Sigma-Aldrich, St. Louis, Mo.). Others of the subject polar compounds, such as the asymmetrically-substituted dialkyl di(ethylene glycol), tri(ethylene glycol), tetra(ethylene glycol) and poly(ethylene glycol) ethers, may be synthesized using a protocol of the type described below.

In accordance with the teachings of the present invention, the aforementioned at least one polar compound may be added to the aqueous solution comprising the polyfunctional amine or may be added to the organic solvent solution comprising the amine-reactive reactant or may be added to both the aqueous solution and the organic solvent solution. Where the aforementioned at least one polar compound is added to the aqueous solution so as to form a mixed solvent in said solution, said at least one polar compound constitutes about 0.001%-5%, by weight, more preferably about 0.01%-3%, by weight, of said mixed solvent. Where the aforementioned at least one polar compound is added to the organic solvent solution so as to form a mixed solvent in said solution, said at least one polar compound constitutes about 0.001%-5%, by weight, more preferably about 0.01%-3%, by weight, of said mixed solvent.

To prepare a composite polyamide reverse osmosis membrane in accordance with the teachings of the present invention, the above-described porous support is coated with the above-described aqueous solution, preferably utilizing either a hand coating or a continuous operation, and the excess solution is then removed from the support, preferably by rolling, sponging, air knifing or other suitable techniques. Following this, the coated support material is contacted, preferably by dipping or spraying, with the above-described organic solvent solution and allowed to remain in place for a period of time, preferably in the range of from about 5 seconds to about 10 minutes, more preferably about 20 seconds to 4 minutes. The resulting product is then dried, preferably by air-drying at room temperature to 40° C. for about 1 minute, and then rinsed in a basic aqueous solution, preferably for about 1 to 30 minutes.

Alternatively, instead of including the aforementioned at least one polar compound in the aqueous solution and/or in the organic solvent solution, one may coat the porous support with an aqueous solution comprising the at least one polar compound and then coat the thus-coated porous support in the manner described above with an aqueous solution comprising the polyfunctional amine so as to form a doubly-coated liquid layer on the porous support. The doubly-coated porous support is then contacted in the manner described above with the organic solvent solution comprising the amine-reactive reactant so as to form an interfacial polyamide layer on the porous support. The resulting product is then dried and rinsed in the manner described above.

The following examples are provided for illustrative purposes only and are in no way intended to limit the scope of the present invention:

EXAMPLE 1

A 140 μm thick microporous polysulfone support including the backing non-woven fabric was soaked for 30 seconds in an aqueous solution containing 2 wt % of meta-phenylenediamine (MPD) and 0.1 wt % di(ethylene glycol) hexyl methyl ether (said di(ethylene glycol) hexyl methyl ether having been prepared according to the technique described below in Example 1A). The support was drained and nip rolled to remove the excess aqueous solution. Then, the coated support was dipped in 0.1 wt % solution of trimesoyl chloride in Isopar® solvent (Exxon Corp.) for 1 minute followed by draining the excess organic solution off the support. The resulting composite membrane was air dried at room temperature for about 1 minute and then rinsed in 0.2% $Na_2CO_3$ aqueous solution at 40-60° C. for 30 minutes before performance test. The performance of the reverse osmosis membrane was measured by passing an aqueous solution containing 2000 ppm of NaCl through the membrane at 225 psi. The salt rejection for the membrane was 98.9% and the flux for the membrane was 21.3 gfd.

EXAMPLE 1A

Preparation of di(ethylene glycol) hexyl methyl ether 120 g of di(ethylene glycol) hexyl ether was added to a solution of 60 g sodium hydroxide in 150 ml water at 55-60° C. while stirring well. 80 g of dimethyl sulfate was slowly (over the course of 2 hours) added to the mixture. After the addition of dimethyl sulfate was complete, the resulting mixture was continuously stirred overnight at 50-55° C. under nitrogen atmosphere. Next, the reaction mixture was cooled to room temperature, and the organic layer was separated from the aqueous layer using a separating funnel. The product was then distilled at 148-158° C. under vacuum (150 mm Hg) to yield about 90 g of di(ethylene glycol) hexyl methyl ether.

EXAMPLE 1B

Alternative Technique for Preparing di(ethylene glycol) hexyl methyl ether 33 g of sodium hydroxide is dissolved in 53 ml of water under nitrogen atmosphere. 50 g of di(ethylene glycol) methyl ether is then added to the sodium hydroxide solution while stirring well. The resulting mixture is then continuously stirred for one hour at 60° C. under nitrogen atmosphere. Then, 140 g of 1-bromohexane is added over the course of 3 hours to the mixture of sodium hydroxide and di(ethylene glycol) methyl ether. The resulting mixture is then heated overnight at 70-80° C. After the reaction mixture is cooled to room temperature, the organic layer is separated from the aqueous layer using a separating tunnel. Distillation of the organic layer first produces unreacted 1-bromohexane and by-products. The product is then distilled at 148-158° C. under vacuum (150 mm Hg) to yield about 60 g of di(ethylene glycol) hexyl methyl ether.

EXAMPLES 2-12 AND COMPARATIVE EXAMPLES A-L

The same procedure as set forth in Example 1 above was carried out for each of Examples 2-12 and Comparative Examples A-L, except that the polar compounds indicated in the TABLE below for Examples 2-12 and Comparative Examples A-L were used instead of the 0.1 wt % di(ethylene glycol) hexyl methyl ether used in Example 1. The concentrations of the various polar compounds and the resultant flux and salt rejection rates for Examples 2-12 and Comparative Examples A-L are shown below in the Table.

TABLE

| EXAMPLE | ADDITIVE(S) | CONCENTRATION (wt %) | FLUX (GFD) | REJECTION (%) |
|---|---|---|---|---|
| 1 | Di(ethylene glycol) hexyl methyl ether | 0.1 | 21.3 | 98.9 |
| 2 | Di(ethylene glycol) heptyl methyl ether | 0.1 | 19.9 | 99.0 |
| 3 | Di(ethylene glycol) benzyl methyl ether | 0.05 | 18.3 | 99.1 |
| 4 | Di(ethylene glycol) pentyl methyl ether | 0.2 | 20.5 | 99.1 |
| 5 | Di(ethylene glycol) butyl methyl ether | 0.2 | 20.3 | 98.9 |
| 6 | Di(ethylene glycol) propyl methyl ether | 0.2 | 17.1 | 98.7 |
| 7 | Di(ethylene glycol) divinyl ether | 0.1 | 18.6 | 98.8 |
| 8 | Tri(ethylene glycol) divinyl ether | 0.1 | 18.5 | 98.7 |
| 9 | Tri(ethylene glycol) butyl methyl ether | 0.2 | 22.8 | 99.0 |
| 10 | Tetra(ethylene glycol) dimethyl ether | 0.2 | 20.6 | 98.9 |
| 11 | Poly(ethylene glycol) dimethyl ether | 0.2 | 18.6 | 98.8 |
| 12 | Poly(ethylene glycol) divinyl ether | 0.2 | 19.4 | 98.8 |
| 13 | Di(ethylene glycol) divinyl ether | 0.5 | 32.3 | 98.4 |
| 14 | Tri(ethylene glycol) divinyl ether | 0.5 | 33.1 | 98.2 |
| Comp. A | No Additive | 0 | 15.2 | 97.1 |
| Comp. B | Di(ethylene glycol) hexyl ether | 0.2 | 27.7 | 97.7 |
| Comp. C | Di(ethylene glycol) butyl ether | 0.2 | 22.3 | 98.0 |
| Comp. D | Di(ethylene glycol) dimethyl ether | 0.2 | 17.6 | 98.3 |
| Comp. E | Di(ethylene glycol) diethyl ether | 0.2 | 16.9 | 98.3 |
| Comp. F | Di(ethylene glycol) dibutyl ether | 0.05 | 16.0 | 98.2 |
| Comp. G | Di(ethylene glycol) t-butyl methyl ether | 0.2 | 19.2 | 98.5 |
| Comp. H | Tri(ethylene glycol) | 0.2 | 16.2 | 98.2 |
| Comp. I | Tri(ethylene glycol) monoethylether | 0.2 | 19.2 | 98.3 |

TABLE-continued

| EXAMPLE | ADDITIVE(S) | CONCENTRATION (wt %) | FLUX (GFD) | REJECTION (%) |
|---|---|---|---|---|
| Comp. J | Tri(ethylene glycol) dimethyl ether | 0.2 | 20.2 | 98.2 |
| Comp. K | Tetra(ethylene glycol) | 0.2 | 17.3 | 98.0 |
| Comp. L | Poly(ethylene glycol) butyl ether | 0.2 | 22.8 | 98.1 |

EXAMPLE 13

The same procedure as set forth in Example 1 was repeated, except that, instead of adding the above-described di(ethylene glycol) hexyl methyl ether to the aqueous solution containing MPD, 0.5 wt % di(ethylene glycol) divinyl ether was added to the 0.1 wt % solution of trimesoyl chloride in Isopar® solvent. As indicated above in the TABLE, the resulting salt rejection was 98.4%, and the flux was 32.3 gfd.

EXAMPLE 14

The same procedure as set forth in Example 1 was repeated, except that, instead of adding the above-described di(ethylene glycol) hexyl methyl ether to the aqueous solution containing MPD, 0.5 wt % tri(ethylene glycol) divinyl ether was added to the 0.1 wt % solution of trimesoyl chloride in Isopar® solvent. As indicated above in the TABLE, the resulting salt rejection was 98.2%, and the flux was 33.1 gfd.

As can be seen from the above data, the polar compounds of the present invention result in membranes whose rejection rate is higher than that which would have been expected. At the same time, such membranes exhibit good flux. For example, if one compares the di(ethylene glycol) hexyl methyl ether of Example 1 to the di(ethylene glycol) hexyl ether of Comparative Example B and to the di(ethylene glycol) dimethyl ether of Comparative Example D, one notes that the rejection rate for di(ethylene glycol) hexyl methyl ether is 98.9% (i.e., salt permeability of 1.1%), as compared to the rejection rates of 97.7% (i.e., salt permeability of 2.3%) and 98.2% (i.e., salt permeability of 1.8%) for di(ethylene glycol) hexyl ether and di(ethylene glycol) dimethyl ether, respectively. Such performance by di(ethylene glycol) hexyl methyl ether represents over 52% less salt permeability as compared to di(ethylene glycol) hexyl ether and over 38% less salt permeability as compared to di(ethylene glycol) dimethyl ether. Similar improvements are also observed for the polar compounds of Examples 2 through 6. In particular, if one compares the di(ethylene glycol) butyl methyl ether of Example 5 to the di(ethylene glycol) t-butyl methyl ether of Comparative Example G, one notes rejection rates of 98.9% (i.e., salt permeability of 1.1%) and 98.5% (i.e., salt permeability of 1.5%), respectively. Such performance represents over 26% less salt permeability for Example 5 as compared to Comparative Example G. Moreover, the flux rates for the membranes of Example 5 and Comparative Example G were 20.3 gfd and 19.2 gfd, respectively.

Additionally, if one compares the di(ethylene glycol) divinyl ether of Example 7 to the di(ethylene glycol) dimethyl ether, di(ethylene glycol) diethyl ether and di(ethylene glycol)dibutyl ether of Comparative Examples D, E and F, respectively, one notes that the rejection rate for di(ethylene glycol) divinyl ether is 98.8% (i.e., salt permeability of 1.2%), as compared to the rejection rates of 98.3% (i.e., salt permeability of 1.7%), 98.3% (i.e., salt permeability of 1.7%) and 98.2% (i.e., salt permeability of 1.8%) for di(ethylene glycol) dimethyl ether, di(ethylene glycol) diethyl ether and di(ethylene glycol) dibutyl ether, respectively. Such performance represents over 29% less salt permeability as compared to di(ethylene glycol) dimethyl ether and di(ethylene glycol) diethyl ether and represents over 33% less salt permeability as compared to di(ethylene glycol) dibutyl ether.

In addition, if one compares the tri(ethylene glycol) divinyl ether of Example 8 and the tri(ethylene glycol) butyl methyl ether of Example 9 to the tri(ethylene glycol) of Comparative Example H, the tri(ethylene glycol) monoethylether of Comparative Example I and the tri(ethylene glycol) dimethyl ether of Comparative Example J, one notes that the rejection rates for tri(ethylene glycol) divinyl ether and tri(ethylene glycol) butyl methyl ether are 98.7% (i.e., salt permeability of 1.3%) and 99.0% (i.e., salt permeability of 1.0%), respectively, as compared to the rejection rates of 98.2% (i.e., salt permeability of 1.8%), 98.3% (i.e., salt permeability of 1.7%) and 98.2% (i.e., salt permeability of 1.8%) for tri(ethylene glycol), tri(ethylene glycol) monoethylether and tri(ethylene glycol) dimethyl ether, respectively. Such performance by tri(ethylene glycol) divinyl ether represents over 27% less salt permeability as compared to tri(ethylene glycol) and tri(ethylene glycol) dimethyl ether and over 23% less salt permeability as compared to tri(ethylene glycol) monoethylether. Such performance by tri(ethylene glycol) butyl methyl ether represents over 44% less salt permeability as compared to tri(ethylene glycol) and tri(ethylene glycol) dimethyl ether and over 41% less salt permeability as compared to tri(ethylene glycol) monoethylether.

Moreover, if one compares the tetra(ethylene glycol) dimethyl ether of Example 10 to the tri(ethylene glycol) dimethyl ether of Comparative Example J and the tetra(ethylene glycol) of Comparative Example K, one notes that the rejection rate for tetra(ethylene glycol) dimethyl ether is 98.9% (i.e., salt permeability of 1.1%) as compared to 98.2% (i.e., salt permeability of 1.8%) and 98.0% (i.e., salt permeability of 2.0%) for tri(ethylene glycol) dimethyl ether and tetra(ethylene glycol), respectively. Such performance represents over 38% less salt permeability as compared to tri(ethylene glycol) dimethyl ether and 45% less salt permeability as compared to tetra(ethylene glycol).

Furthermore, if one compares the poly(ethylene glycol) dimethyl ether of Example 11 and the poly(ethylene glycol) divinyl ether of Example 12 to the tri(ethylene glycol) dimethyl ether of Comparative Example J and the poly(ethylene glycol) butyl ether of Comparative Example L, one notes that the rejection rates for poly(ethylene glycol) dimethyl ether and poly(ethylene glycol) divinyl ether are both 98.8% (i.e., salt permeability of 1.2%) as compared to 98.2% (i.e., salt permeability of 1.8%) and 98.1% (i.e., salt permeability of 1.9%) for tri(ethylene glycol) dimethyl ether and poly(ethylene glycol) butyl ether, respectively. Such performance represents over 33% less salt permeability as compared to tri (ethylene glycol) dimethyl ether and 36% less salt permeability as compared to poly(ethylene glycol) butyl ether.

Lastly, it should be noted that the addition of di(ethylene glycol) divinyl ether and tri(ethylene glycol) divinyl ether to the organic solvent solutions in Examples 13 and 14, respectively, resulted in rejection rates of 98.4% (i.e., salt permeability of 1.6%) and 98.2% (i.e., salt permeability of 1.8%), respectively, and flux rates of 32.3 gfd and 33.1 gfd, respectively, as compared to a rejection rate of 97.1% (i.e., salt permeability of 2.9%) and a flux rate of 15.2 gfd for no additive (Comparative Example A). Such performance for di(ethylene glycol) divinyl ether represents over 44% less salt permeability and a flux increase of over 112% as compared to no additive. Such performance for tri(ethylene glycol) divinyl ether represents over 37% less salt permeability and a flux increase of over 117% as compared to no additive.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A method of making a composite reverse osmosis membrane, said method comprising the steps of:
   (a) coating a porous support with an aqueous solution comprising a polyfunctional amine so as to form a liquid layer on said porous support;
   (b) contacting said liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support, wherein at least one of said aqueous solution and said organic solvent solution further comprises a polar compound selected from the group consisting of di(ethylene glycol) normal decyl methyl ether; di(ethylene glycol) normal octyl methyl ether; di(ethylene glycol) benzyl methyl ether; di(ethylene glycol) normal heptyl methyl ether; di(ethylene glycol) normal hexyl methyl ether; di(ethylene glycol) normal pentyl methyl ether; di(ethylene glycol) normal butyl methyl ether; di(ethylene glycol) normal propyl methyl ether; tri(ethylene glycol) normal decyl methyl ether; tri(ethylene glycol) normal octyl methyl ether; tri(ethylene glycol) benzyl methyl ether; tri(ethylene glycol) normal heptyl methyl ether; tri(ethylene glycol) normal hexyl methyl ether; tri(ethylene glycol) normal pentyl methyl ether; tri(ethylene glycol) normal butyl methyl ether; tri(ethylene glycol) normal propyl methyl ether; tetra(ethylene glycol) normal decyl methyl ether; tetra(ethylene glycol) normal octyl methyl ether; tetra(ethylene glycol) benzyl methyl ether; tetra(ethylene glycol) normal heptyl methyl ether; tetra(ethylene glycol) normal hexyl methyl ether; tetra(ethylene glycol) normal pentyl methyl ether; tetra(ethylene glycol) normal butyl methyl ether; tetra(ethylene glycol) normal propyl methyl ether; tetra(ethylene glycol) dimethyl ether; poly(ethylene glycol) dimethyl ether wherein said poly(ethylene glycol) consists of (ethylene glycol) homologues greater than tetra(ethylene glycol); di(ethylene glycol) divinyl ether; tri(ethylene glycol) divinyl ether; tetra(ethylene glycol) divinyl ether; poly(ethylene glycol) divinyl ether wherein said poly(ethylene glycol) consists of (ethylene glycol) homologues greater than tetra(ethylene glycol); and mixtures thereof, and
   (c) drying the product of step (b) to form a composite reverse osmosis membrane.

2. The method as claimed in claim 1 further comprising the step of rinsing the product of step (c) in a basic aqueous solution.

3. The method as claimed in claim 1 wherein only said aqueous solution of said aqueous solution and said organic solvent solution further comprises said polar compound.

4. The method as claimed in claim 1 wherein only said organic solvent solution of said aqueous solution and said organic solvent solution further comprises said polar compound.

5. The method as claimed in claim 1 wherein each of said aqueous solution and said organic solvent solution further comprises said polar compound.

6. A method of making a composite reverse osmosis membrane, said method comprising the steps of:
   (a) coating a porous support with a mixed solvent comprising water and at least one polar compound so as to form a liquid layer on said porous support, said at least one polar compound being selected from the group consisting of di(ethylene glycol) normal decyl methyl ether; di(ethylene glycol) normal octyl methyl ether; di(ethylene glycol) benzyl methyl ether; di(ethylene glycol) normal heptyl methyl ether; di(ethylene glycol) normal hexyl methyl ether; di(ethylene glycol) normal pentyl methyl ether; di(ethylene glycol) normal butyl methyl ether; di(ethylene glycol) normal propyl methyl ether; tri(ethylene glycol) normal decyl methyl ether; tri(ethylene glycol) normal octyl methyl ether; tri(ethylene glycol) benzyl methyl ether; tri(ethylene glycol) normal heptyl methyl ether; tri(ethylene glycol) normal hexyl methyl ether; tri(ethylene glycol) normal pentyl methyl ether; tri(ethylene glycol) normal butyl methyl ether; tri(ethylene glycol) normal propyl methyl ether; tetra(ethylene glycol) normal decyl methyl ether; tetra(ethylene glycol) normal octyl methyl ether; tetra(ethylene glycol) benzyl methyl ether; tetra(ethylene glycol) normal heptyl methyl ether; tetra(ethylene glycol) normal hexyl methyl ether; tetra(ethylene glycol) normal pentyl methyl ether; tetra(ethylene glycol) normal butyl methyl ether; tetra(ethylene glycol) normal propyl methyl ether; tetra(ethylene glycol) dimethyl ether; poly(ethylene glycol) dimethyl ether wherein said poly(ethylene glycol) consists of (ethylene glycol) homologues greater than tetra(ethylene glycol); di(ethylene glycol) divinyl ether; tri(ethylene glycol) divinyl ether; tetra(ethylene glycol) divinyl ether; poly(ethylene glycol) divinyl ether wherein said poly(ethylene glycol) consists of (ethylene glycol) homologues greater than tetra(ethylene glycol); and mixtures thereof;
   (b) coating said liquid layer with an aqueous solution comprising a polyfunctional amine so as to form a doubly-coated liquid layer on said porous support;
   (c) contacting said doubly-coated liquid layer with an organic solvent solution comprising an amine-reactive reactant selected from the group consisting of a polyfunctional acyl halide, a polyfunctional sulfonyl halide and a polyfunctional isocyanate so as to interfacially condense said amine-reactive reactant with said polyfunctional amine, thereby forming a cross-linked, interfacial polyamide layer on said porous support; and
   (d) drying the product of step (c) to form a composite reverse osmosis membrane.

* * * * *